United States Patent
Nakamura et al.

(10) Patent No.: US 11,467,060 B2
(45) Date of Patent: Oct. 11, 2022

(54) OPTICAL PULSE REFLECTOMETER AND OPTICAL PULSE REFLECTOMETRY

(71) Applicant: NIPPON TELEGRAPH AND TELEPHONE CORPORATION, Tokyo (JP)

(72) Inventors: Atsushi Nakamura, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/286,605

(22) PCT Filed: Jun. 6, 2019

(86) PCT No.: PCT/JP2019/022508
§ 371 (c)(1),
(2) Date: Apr. 19, 2021

(87) PCT Pub. No.: WO2020/084825
PCT Pub. Date: Apr. 30, 2020

(65) Prior Publication Data
US 2021/0356358 A1 Nov. 18, 2021

(30) Foreign Application Priority Data
Oct. 22, 2018 (JP) .............................. JP2018-198735

(51) Int. Cl.
*G01M 11/00* (2006.01)

(52) U.S. Cl.
CPC ...... *G01M 11/319* (2013.01); *G01M 11/3109* (2013.01); *G01M 11/3145* (2013.01)

(58) Field of Classification Search
CPC ............... G01M 11/31; G01M 11/319; G01M 11/3109; G01M 11/3118; G01M 11/3127;
(Continued)

(56) References Cited

U.S. PATENT DOCUMENTS 9,784,567 B2 * 10/2017 Wang ................... G01B 11/168
10,760,993 B2 * 9/2020 Maruyama ......... G01M 11/3145
(Continued)

FOREIGN PATENT DOCUMENTS

JP          2003014584 A          1/2003
JP          2015021748 A    *     2/2015
(Continued)

OTHER PUBLICATIONS

Atsushi Nakamura et al., High-sensitivity detection of fiber bends: 1-μm-band mode-detection OTDR, J . . . Lightw. Technol, vol. 33, No. 23, 2015, pp. 4862-4869.
(Continued)

*Primary Examiner* — Gordon J Stock, Jr.

(57) ABSTRACT

An optical pulse test apparatus according to the present disclosure includes a light generation unit configured to generate an optical pulse for generating backscattered light beams in an optical fiber under test and generate first light having an optical frequency for amplifying backscattered light in an LP11 mode out of the backscattered light beams in two LP modes through stimulated Brillouin scattering, and second light having an optical frequency for attenuating backscattered light in an LP01 mode out of the backscattered light beams in the two LP modes through stimulated Brillouin scattering, a mode demultiplexing unit configured to input the optical pulse, the first light, and the second light generated by the light generation unit into the optical fiber under test in the LP01 mode and separate, out of the backscattered light beams generated by the optical pulse, the backscattered light in the LP11 mode, a local oscillation light generation unit configured to generate local oscillation light by which the backscattered light separated by the mode demultiplexing unit is heterodyne-detected, a light reception unit configured to multiplex the backscattered light in the LP11 mode separated by the mode demultiplexing unit and
(Continued)

the local oscillation light generated by the local oscillation light generation unit and photoelectrically convert the multiplexed light into an electrical signal, and an arithmetic processing unit configured to calculate a time-intensity distribution of the electrical signal obtained by the light reception unit photoelectrically converting the backscattered light in the LP11 mode.

10 Claims, 5 Drawing Sheets

(58) Field of Classification Search
CPC ......... G01M 11/3136; G01M 11/3145; G01M 11/3164; G01M 11/3163; G01M 11/3172; G01M 11/3181
See application file for complete search history.

(56) References Cited

U.S. PATENT DOCUMENTS

| | | | |
|---|---|---|---|
| 2003/0007142 | A1 | 1/2003 | Hotate et al. |
| 2020/0408636 | A1* | 12/2020 | Takahashi .......... G01M 11/0285 |
| 2021/0018343 | A1* | 1/2021 | Takahashi .............. G01D 5/353 |
| 2021/0356357 | A1* | 11/2021 | Okamoto ........... H04B 10/2916 |
| 2021/0381925 | A1* | 12/2021 | Takahashi .......... G01M 11/3145 |
| 2021/0396626 | A1* | 12/2021 | Okamoto ................ H04L 29/14 |

FOREIGN PATENT DOCUMENTS

| | | | |
|---|---|---|---|
| JP | 2015152399 A | | 8/2015 |
| JP | 2015197384 A | | 11/2015 |
| JP | 2017003338 A | * | 1/2017 |
| JP | 201848917 A | | 3/2018 |

OTHER PUBLICATIONS

Atsushi Nakamura et al., Highly sensitive detection of microbending in single-mode fibers and its applications, Opt. Express, vol. 25, No. 5, 2017, pp. 5742-5748.

Hiroshi Takahashi et al., Modal attenuation evaluation with Brillouin Stokes assisted OTDR for dynamic crosstalk suppression, Proceedings of the 2018 IEICE Communication Society Conference, Sep. 11, 2018, p. 234.

* cited by examiner

OPTICAL PULSE REFLECTOMETER AND OPTICAL PULSE REFLECTOMETRY

CROSS-REFERENCE TO RELATED APPLICATIONS

This application is a 371 U.S. National Phase of International Application No. PCT/JP2019/022508 filed on Jun. 6, 2019, which claims priority to Japanese Application No. 2018-198735 filed on Oct. 22, 2018. The entire disclosures of the above applications are incorporated herein by reference.

TECHNICAL FIELD

The present disclosure relates to an optical pulse test apparatus for measuring a characteristic of an optical fiber, and relates also to an optical pulse test method.

BACKGROUND ART

Optical time domain reflectometry (hereinafter referred to as "OTDR") is a method for acquiring distribution data (an OTDR waveform) based on intensities and round trip times of backscattered light of Rayleigh scattered light or Fresnel reflected light resulting from an optical pulse propagating through an optical fiber under test into which pulsed light enters. This technique, by which it is possible to measure an optical fiber loss distribution, identify a problematic location, and measure an optical characteristic of an optical fiber, is employed for maintenance management of an optical fiber and an optical fiber characteristic evaluation (for example, see PTL 1).

NPL 1 and NPL 2 disclose techniques for detecting a bend and a lateral pressure generated in an optical fiber with high sensitivity compared to the OTDR known in the art. That is, the above techniques are a method for measuring not only a fundamental mode (LP01 mode) component included in backscattered light, but also a first high-order mode (LP11 mode) component, by using test light with a wavelength at which a general single mode fiber operates in two modes and a mode multiplexer/demultiplexer. In the techniques, loss information experienced in the LP11 mode having a higher loss sensitivity to a bend and a lateral pressure than in the LP01 mode is obtained to achieve high sensitivity detection of a bend and a lateral pressure.

CITATION LIST

Patent Literature

PTL 1: JP 2015-152399 A

Non Patent Literature

NPL 1: A. Nakamura et. al., "High-sensitivity detection of fiber bends: 1-μm-band mode-detection OTDR," J. Lightw. Technol., vol. 33, no. 23, pp. 4862-4869, 2015.
NPL 2: A. Nakamura et. al., "Highly sensitive detection of microbending in single-mode fibers and its applications," Opt. Express, vol. 25, no. 5, pp. 5742-5748, 2017.

SUMMARY OF THE INVENTION

Technical Problem

Here, it is considered applying the techniques disclosed in NPL 1 and NPL 2 to measurement of an optical fiber network constructed in a field. In these techniques, a crosstalk occurs between the LP01 mode and the LP11 mode at a connection point and the like of the optical fiber, and thus, "loss information experienced in the LP11 mode with higher loss sensitivity" and "loss information experienced in the LP01 mode with lower loss sensitivity" are mixed. This may result in a problem that a detection sensitivity for a bend and a lateral pressure is degraded.

The present invention has been made in light of the foregoing, and an object thereof is to provide an optical pulse test apparatus capable of detecting loss information in an LP11 mode with high sensitivity even in an optical fiber network with a modal crosstalk and also to provide an optical pulse test method therefor.

Means for Solving the Problem

To achieve the object described above, the optical pulse test apparatus and the optical pulse test method of the present disclosure are characterized by amplifying, out of backscattered light beams in two LP modes, the backscattered light in an LP11 mode and attenuating the backscattered light in an LP01 mode to acquire an OTDR waveform of the backscattered light in the LP11 mode.

Specifically, an optical pulse test apparatus according to the present disclosure includes a light generation unit configured to generate an optical pulse for generating backscattered light beams in an optical fiber under test and generate first light having an optical frequency for amplifying backscattered light in an LP11 mode out of the backscattered light beams in two LP modes through stimulated Brillouin scattering, and second light having an optical frequency for attenuating backscattered light in an LP01 mode out of the backscattered light beams in the two LP modes through stimulated Brillouin scattering, a mode demultiplexing unit configured to input the optical pulse, the first light, and the second light generated by the light generation unit into the optical fiber under test in the LP01 mode and separate backscattered light in the LP11 mode out of backscattered light beams generated by the optical pulse, a local oscillation light generation unit configured to generate local oscillation light by which the backscattered light separated by the mode demultiplexing unit is heterodyne-detected, a light reception unit configured to multiplex the backscattered light in the LP11 mode separated by the mode demultiplexing unit and the local oscillation light generated by the local oscillation light generation unit and photoelectrically convert the multiplexed light into an electrical signal, and an arithmetic processing unit configured to calculate a time-intensity distribution of the electrical signal obtained by the light reception unit photoelectrically converting the backscattered light in the LP11 mode.

Specifically, an optical pulse test method according to the present disclosure includes generating an optical pulse for generating backscattered light beams in an optical fiber under test and generating first light having an optical frequency for amplifying backscattered light in an LP11 mode out of the backscattered light beams in two LP modes through stimulated Brillouin scattering and second light having an optical frequency for attenuating backscattered light in an LP01 mode out of the backscattered light beams in the two LP modes through stimulated Brillouin scattering, inputting the generated optical pulse, first light, and second light into the optical fiber under test in the LP01 mode and separating the backscattered light in the LP11 mode out of the backscattered light beams generated by the optical pulse, generating local oscillation light by which the separated backscattered light is heterodyne-detected, multiplexing the separated backscattered light in the LP11 mode and the generated local oscillation light and photoelectrically converting the multiplexed light into an electrical signal, and calculating a time-intensity distribution of the electrical signal obtained by photoelectrically converting the backscattered light in the LP11 mode.

Effects of the Invention

The present invention can provide an optical pulse test apparatus capable of detecting a bend and a lateral pressure with high sensitivity in an optical fiber network in which a modal crosstalk exists and also provide an optical pulse test method therefor.

DESCRIPTION OF EMBODIMENTS

Figure 1:
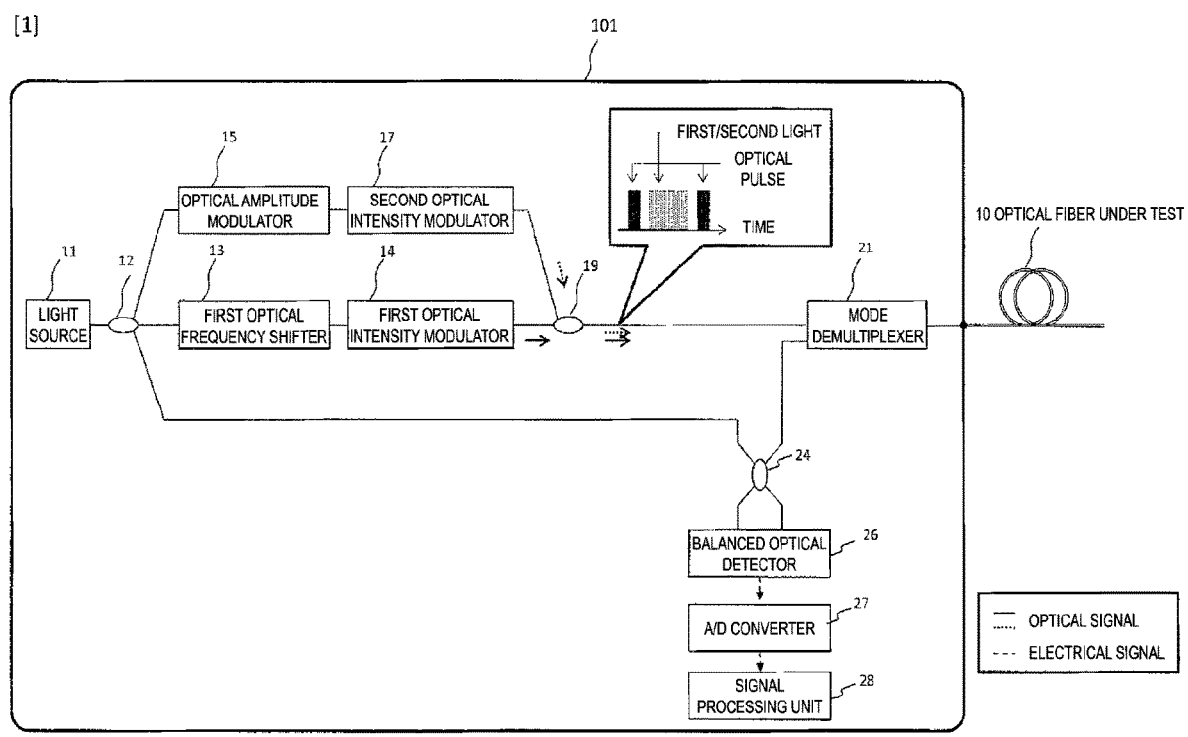
FIG. 1 is a diagram illustrating an optical pulse test apparatus according to the present disclosure.

An embodiment of the present disclosure will be described below in detail with reference to the drawings. Note that the present disclosure is not limited to the embodiment described below. The embodiment is merely an example, and the present disclosure can be implemented with various modifications and improvements made to the invention based on knowledge of a person skilled in the art. In this specification and the drawings, constituent elements having the identical reference signs are assumed to be the same.

An optical frequency (wavelength) employed in the present embodiment is assumed to be an optical frequency (wavelength) at which an optical fiber under test operates in two LP modes, that is, an LP01 mode and an LP11 mode.

In the present embodiment, an optical pulse acts as probe light for generating backscattered light beams in a fiber under test. First light acts as pump light with an optical frequency for amplifying backscattered light in the LP11 mode through stimulated Brillouin scattering, out of the backscattered light beams in the two LP modes. Second light acts as pump light with an optical frequency for attenuating backscattered light in the LP01 mode through stimulated Brillouin scattering, out of the backscattered light beams in the two LP modes.

First Embodiment

In an embodiment according to the present disclosure, an optical pulse test apparatus 101 includes a light generation unit, a mode demultiplexing unit, a local oscillation light generation unit, a light reception unit, and an arithmetic processing unit.

The light generation unit generates an optical pulse for generating backscattered light beams in an optical fiber under test, and generates, out of the backscattered light beams in the two LP modes, first light having an optical frequency for amplifying backscattered light in the LP11 mode through stimulated Brillouin scattering, and out of the backscattered light beams in the two LP modes, second light having an optical frequency for attenuating backscattered light in the LP01 mode through stimulated Brillouin scattering.

The mode demultiplexing unit inputs the optical pulse, the first light, and the second light generated by the light generation unit into the optical fiber under test in the LP01 mode and separates, out of the generated backscattered light beam generated by the optical pulse, the backscattered light in the LP11 mode.

The local oscillation light generation unit generates local oscillation light by which the backscattered light separated by the mode demultiplexing unit is heterodyne-detected. The light reception unit multiplexes the backscattered light in the LP11 mode separated by the mode demultiplexing unit and the local oscillation light generated by the local oscillation light generation unit and photoelectrically converts the multiplexed light into an electrical signal. The arithmetic processing unit calculates a time-intensity distribution of the electrical signal obtained by the light reception unit photoelectrically converting the backscattered light in the LP11 mode.

An example of a configuration of the optical pulse test apparatus of the embodiment according to the present disclosure is illustrated in FIG. 1.

In FIG. 1, the light generation unit includes a light source 11, an optical splitter 12, a first optical frequency shifter 13, a first optical intensity modulator 14, an optical amplitude modulator 15, a second optical intensity modulator 17, and an optical coupler 19. The light source 11 outputs continuous light having an optical frequency $v_0$. The output continuous light is split by the optical splitter 12. One part of the split continuous light has an optical frequency converted into $v_0 + \Delta v_1$ by the first optical frequency shifter 13, and then is pulsed by the first optical intensity modulator 14.

In addition, using the other part of the split continuous light as a carrier wave, the continuous light having an optical frequency $v_0$ is subject to double side-band amplitude modulation with suppressed carrier, by the optical amplitude modulator 15, with a sine wave signal having a frequency $\Delta v_2$, and converted into two continuous light beams, that is, first light having an optical frequency $v_0 + \Delta v_2$ and second light having an optical frequency $v_0 - \Delta v_2$. The optical amplitude modulator 15 is, for example, a Mach-Zehnder type LN amplitude modulator.

Another configuration of the optical amplitude modulator 15 will be described. The optical amplitude modulator 15 is configured such that using the other part of the continuous light split by the optical splitter 12 as a carrier wave, the continuous light having an optical frequency $v_0$ is subject to single side-band amplitude modulation with suppressed carrier, by two optical amplitude modulators, with a sine wave signal having a frequency $\Delta v_2$, respectively, and is converted into two continuous light beams, that is, first light having an optical frequency $v_0+\Delta v_2$ and second light having an optical frequency $v_0-\Delta v_2$, and multiplexed.

The optical pulse having an optical frequency $v_0+\Delta v_1$, the first light having an optical frequency $v_0+\Delta v_2$, the second light having an optical frequency $v_0-\Delta v_2$ are multiplexed by the optical coupler 19.

The first light having an optical frequency $v_0+\Delta v_2$ and the second light having an optical frequency $v_0-\Delta v_2$ output from the optical amplitude modulator 15 may be multiplexed, while the both remaining unchanged as the continuous light beams, with the optical pulse having the optical frequency $v_0+\Delta v_1$ by the optical coupler 19. Both or one of the first light having an optical frequency $v_0+\Delta v_2$ and the second light having an optical frequency $v_0-\Delta v_2$ output from the optical amplitude modulator 15 may be pulsed by the second optical intensity modulator 17, and multiplexed with the optical pulse having the optical frequency $v_0+\Delta v_1$ by the optical coupler 19. In FIG. 1, both the first light having an optical frequency $v_0+\Delta v_2$ and the second light having an optical frequency $v_0-\Delta v_2$ output from the optical amplitude modulator 15 are pulsed simultaneously by the second optical intensity modulator 17 and multiplexed with an optical pulse having an optical frequency $v_0+\Delta v_1$ by the optical coupler 19.

When the first light and/or the second light is pulsed, it is desirable that a pulsed leading edge of such light follows a trailing edge of the optical pulse. This is to prevent the influence of the Brillouin amplification and the Brillouin attenuation while the optical pulse is traveling in an optical fiber under test described later.

When the first optical intensity modulator 14 repeatedly generates an optical pulse and the first light and/or the second light is pulsed, it is desirable that a pulsed trailing edge of such light precedes the subsequent leading edge of the optical pulse. This is to prevent the influence of the Brillouin amplification and the Brillouin attenuation while the optical pulse is traveling in an optical fiber under test described later. In an output from the optical coupler 19 illustrated in FIG. 1, a temporal relationship in the output between the optical pulse and the pulsed first light and second light is also illustrated together.

An optical frequency difference between the optical pulse, and the first light and the second light is set to amplify backscattered light in the LP11 mode and attenuate backscattered light in the LP01 mode through stimulated Brillouin scattering. Here, in the optical pulse test apparatus of the present embodiment, the optical frequency of the optical pulse generated by the light generation unit is $v_0+\Delta v_1$, the optical frequency of the first light is $v_0+\Delta v_2$, and the optical frequency of the second light is $v_0-\Delta v_2$. At this time, $\Delta v_2-\Delta v_1$ which is the difference between the optical frequency of the first light and the optical frequency of the optical pulse is an optical frequency difference in which a power more greatly shifts from the first light to the backscattered light in the LP11 mode than in the LP01 mode, out of the backscattered light beams in the two LP modes, through the stimulated Brillouin scattering. At this time, $\Delta v_2+\Delta v_1$ which is the difference between the optical frequency of the optical pulse and the optical frequency of the second light is an optical frequency difference in which a power more greatly shifts to the second light from the backscattered light in the LP01 mode than in the LP11 mode, out of the backscattered light beams in the two LP modes, through the stimulated Brillouin scattering.

In FIG. 1, the mode demultiplexing unit includes a mode demultiplexer 21. The optical pulse, the first light, and the second light generated by the light generation unit enter the mode demultiplexer 21. The mode demultiplexer 21 is a mode demultiplexer provided with a directional coupler including a planar lightwave circuit as described in NPL 2. The optical pulse, the first light, and the second light enter one end of the optical fiber under test 10, in the LP01 mode, from the mode demultiplexer 21. Out of the backscattered light and reflected light beams from the optical fiber under test 10, a component in the LP11 mode is demultiplexed by the mode demultiplexer 21.

In FIG. 1, the local oscillation light generation unit utilizes, as local oscillating light, the continuous light from the light source 11 that is split by the optical splitter 12.

In FIG. 1, the light reception unit includes an optical coupler 24 and a balanced optical detector 26. Out of the backscattered light beams and the reflected light beams having the optical frequency $v_0+\Delta v_1$ separated for each mode by the mode demultiplexer 21, the component in the LP11 mode is guided to the optical coupler 24 and multiplexed with the local oscillation light having the optical frequency $v_0$. Thereafter, the resultant light is photoelectrically converted by the balanced optical detector 26.

In FIG. 1, the arithmetic processing unit includes an analog/digital (A/D) converter 27 and a signal processing unit 28. An electrical signal from the balanced optical detector 26 is converted to digital data by the A/D converter 27. The digital data is input to the signal processing unit 28. The signal processing unit 28 extracts an amplitude of the frequency component $\Delta v_1$ from the digital data through fast Fourier transform, and acquires a time response to the obtained waveform as a time-intensity distribution (OTDR waveform) for the backscattered light in the LP11 mode.

A feature that the optical pulse test apparatus having the configuration illustrated in FIG. 1 amplifies the backscattered light in the LP11 mode and further attenuates the backscattered light in the LP01 mode will be described below.

Figure 3:
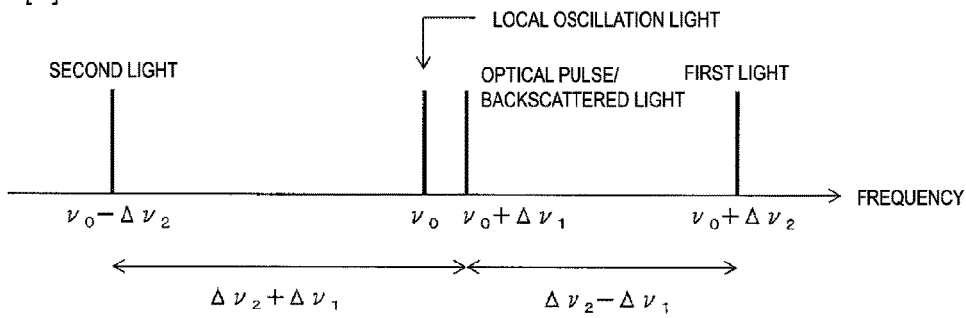
FIG. 3 is a chart showing a relationship of optical frequencies according to the optical pulse test apparatus of the present disclosure.

A case will be considered where the optical pulse having the optical frequency $v_0+\Delta v_1$, the first light having the optical frequency $v_0+\Delta v_2$, and the second light having the optical frequency $v_0-\Delta v_2$ enter the optical fiber under test 10. A relationship among these optical frequencies is shown in FIG. 3.

When the entered optical pulse propagates through the optical fiber under test 10, the backscattered light beams in the LP01 mode and the LP11 mode are generated. The optical frequencies of the backscattered light beams, which are equal to that of the optical pulse, are $v_0+\Delta v_1$. The backscattered light in each of the modes returns to an incident end side of the optical pulse. The backscattered light propagates in opposition to the entered first light and second light. When these opposed light beams propagate and pass by, if an optical frequency difference between the light beams is within a Brillouin frequency shift band, power shifts from the light beam having a higher frequency to the light beam having a lower frequency. Here, the Brillouin frequency shift band depends on a combination of modes of the light beams propagating while countering with each other, and thus, the Brillouin frequency shift bands are different between the backscattered light beams in the LP01 mode and the LP11 mode.

Figure 4:
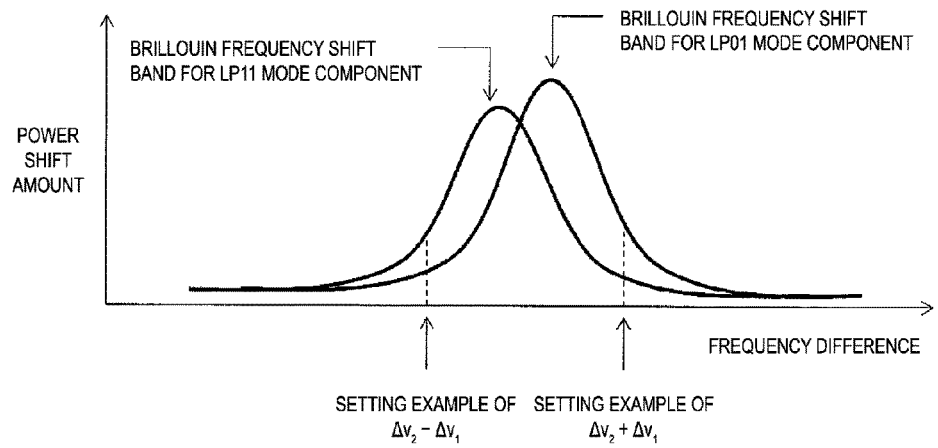
FIG. 4 is a graph showing a relationship of Brillouin frequency shift bands.

FIG. 4 shows a relationship of the Brillouin frequency shift band for the backscattered light beams in the LP01 mode and the LP11 mode. A horizontal axis represents a frequency difference, and a vertical axis represents a magnitude of power shifted through Brillouin scattering.

Here, the optical frequency difference $\Delta v_2+\Delta v_1$ between the backscattered light in the LP01 mode having the optical frequency $v_0+\Delta v_1$ and the second light having the optical frequency $v_0-\Delta v_2$ is set to an optical frequency difference where the power shift from the backscattered light in the LP01 mode to the second light is as large as possible, and the power shift from the backscattered light in the LP11 mode to the second light is as small as possible. Such an optical frequency difference may attenuate the backscattered light in the LP01 mode.

Further, the optical frequency difference $\Delta v_2-\Delta v_1$ between the backscattered light in the LP11 mode having the optical frequency $v_0+\Delta v_1$ and the first light having the optical frequency $v_0+\Delta v_2$ is set to an optical frequency difference where the power shift from the first light to the backscattered light in the LP11 mode is as large as possible, and further, the power shift from the first light to the backscattered light in the LP01 mode is as small as possible. Such an optical frequency difference may amplify the backscattered light in the LP11 mode.

With the optical pulse test apparatus and the optical pulse test method according to the present disclosure, it is possible to detect a bend and a lateral pressure with high sensitivity even in an optical fiber network in which a modal crosstalk exists. It is further possible to generate the first light having the optical frequency $v_0+\Delta v_2$ and the second light having the optical frequency $v_0-\Delta v_2$ by a single optical amplitude modulator.

Second Embodiment

Figure 2:
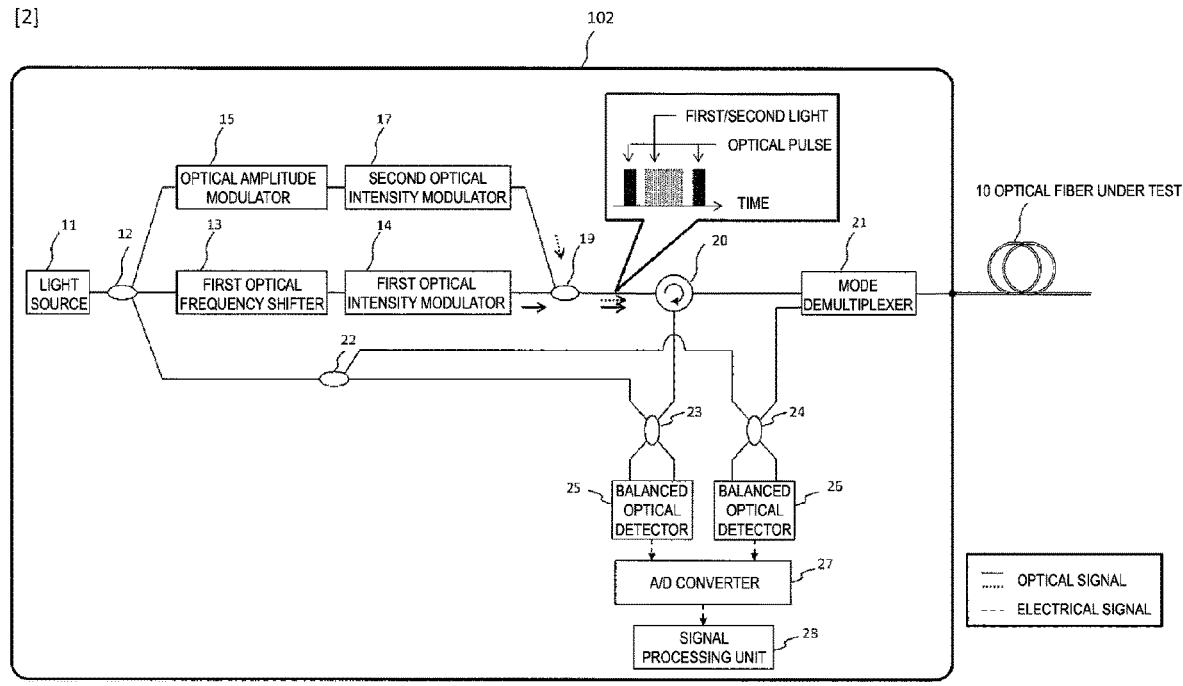
FIG. 2 is a diagram illustrating an optical pulse test apparatus according to the present disclosure.

An example of a configuration of an optical pulse test apparatus 102 of an embodiment according to the present disclosure is illustrated in FIG. 2. The optical pulse test apparatus in the embodiment according to the present disclosure, as illustrated in FIG. 2, includes the following features in addition to those of the optical pulse test apparatus according to the first embodiment. The characteristics are such that the mode demultiplexing unit also separates the backscattered light in the LP01 mode, out of the backscattered light beams generated by the optical pulse, the light reception unit further multiplexes the backscattered light in the LP01 mode separated by the mode demultiplexing unit and the local oscillation light generated by the local oscillation light generation unit and photoelectrically converts the multiplexed light into an electrical signal, and the arithmetic processing unit further calculates the time-intensity distribution (OTDR waveform) of the electrical signal obtained by the light reception unit photoelectrically converting the backscattered light in the LP01 mode.

An optical frequency difference between the optical pulse, and the first light and the second light is set to amplify the backscattered light in the LP11 mode through stimulated Brillouin scattering and further attenuate the backscattered light in the LP01 mode. Here, in the optical pulse test apparatus of the present embodiment, the optical frequency of the optical pulse generated by the light generation unit is $v_0+\Delta v_1$, the optical frequency of the first light is $v_0+\Delta v_2$, and the optical frequency of the second light is $v_0-\Delta v_2$. At this time, the difference $\Delta v_2-\Delta v_1$ between the optical frequency of the first light and the optical frequency of the optical pulse is an optical frequency difference where the power more greatly shifts from the first light to the backscattered light in the LP11 mode than the light in the LP01 mode, out of the backscattered light beams in the two LP modes, through the stimulated Brillouin scattering. At this time, $\Delta v_2+\Delta v_1$ which is the difference between the optical frequency of the optical pulse and the optical frequency of the second light and is an optical frequency difference in which a power more greatly shifts to the second light from the backscattered light in the LP01 mode than in the LP11 mode, out of the backscattered light beams in the two LP modes, through the stimulated Brillouin scattering.

In FIG. 2, the light generation unit is similar in configuration to that in the first embodiment.

In FIG. 2, the mode demultiplexing unit further includes an optical circulator 20 between the optical coupler 19 and the mode demultiplexer 1. The optical pulse, the first light, and the second light generated by the light generation unit enter the mode demultiplexer 21 via the optical circulator 20. The mode demultiplexer 21 is a mode demultiplexer provided with a directional coupler including a planar lightwave circuit as described in NPL 2. The optical pulse, the first light, and the second light enter one end of the optical fiber under test 10, in the LP01 mode, from the mode demultiplexer 21. Out of the backscattered light and reflected light beams from the optical fiber under test 10, a component in the LP11 mode is demultiplexed by the mode demultiplexer 21. A component in the LP01 mode is separated by the optical circulator 20.

In FIG. 2, the local oscillation light generation unit further includes an optical splitter 22 configured to split the continuous light from the light source 11 split by the optical splitter 12, and utilizes the split light beams as two local oscillation light beams.

In FIG. 2, the light reception unit further includes an optical coupler 23 and a balanced optical detector 25. In addition to the first embodiment, out of the backscattered light beams and the reflected light beams separated by the mode demultiplexer 21 for each mode, the component in the LP01 mode is multiplexed with the local oscillation light by the optical coupler 23 by way of the optical circulator 20, and thereafter, photoelectrically converted by the balanced optical detector 25.

In FIG. 2, the arithmetic processing unit includes the analog/digital (A/D) converter 27 and the signal processing unit 28. Electrical signals from the balanced optical detectors 25 and 26 are converted to digital data by the A/D converter 27. The digital data is input to the signal processing unit 28. The signal processing unit 28 extracts an amplitude of the optical frequency component $v_0+\Delta v_1$ from the digital data through fast Fourier transform, and acquires a time response to the obtained waveform as a time-intensity distribution (OTDR waveform) for the backscattered light in the LP01 mode or the LP11 mode.

With the optical pulse test apparatus and the optical pulse test method of the embodiment according to the present disclosure, it is possible to detect a bend and a lateral pressure with high sensitivity even in an optical fiber network in which a modal crosstalk exists. It is further possible to generate the first light having the optical frequency $v_0+\Delta v_2$ and the second light having the optical frequency $v_0-\Delta v_2$ by a single optical amplitude modulator. It is further possible to obtain detailed information on a bend and a lateral pressure even in an optical fiber network in which a modal crosstalk exists by observing not only the backscattered light in the LP11 mode but also the backscattered light in the LP01 mode, out of the backscattered light beams in the two LP modes.

Third Embodiment

In an embodiment according to the present disclosure, an optical pulse test apparatus 103 includes a light generation unit, a mode demultiplexing unit, a local oscillation light generation unit, a light reception unit, and an arithmetic processing unit.

The light generation unit generates an optical pulse for generating backscattered light beams in an optical fiber under test, and generates, out of the backscattered light beams in the two LP modes, first light having an optical frequency for amplifying backscattered light in the LP11 mode through stimulated Brillouin scattering, and out of the backscattered light beams in the two LP modes, second light having an optical frequency for attenuating backscattered light in the LP01 mode through stimulated Brillouin scattering.

The mode demultiplexing unit inputs the optical pulse, the first light, and the second light generated by the light generation unit into the optical fiber under test in the LP01 mode and separates, out of the generated backscattered light beam generated by the optical pulse, the backscattered light in the LP11 mode.

The local oscillation light generation unit generates local oscillation light by which the backscattered light separated by the mode demultiplexing unit is heterodyne-detected.

The light reception unit multiplexes the backscattered light in the LP11 mode separated by the mode demultiplexing unit and the local oscillation light generated by the local oscillation light generation unit and photoelectrically converts the multiplexed light into an electrical signal. The arithmetic processing unit calculates a time-intensity distribution of the electrical signal obtained by the light reception unit photoelectrically converting the backscattered light in the LP11 mode.

Figure 5:
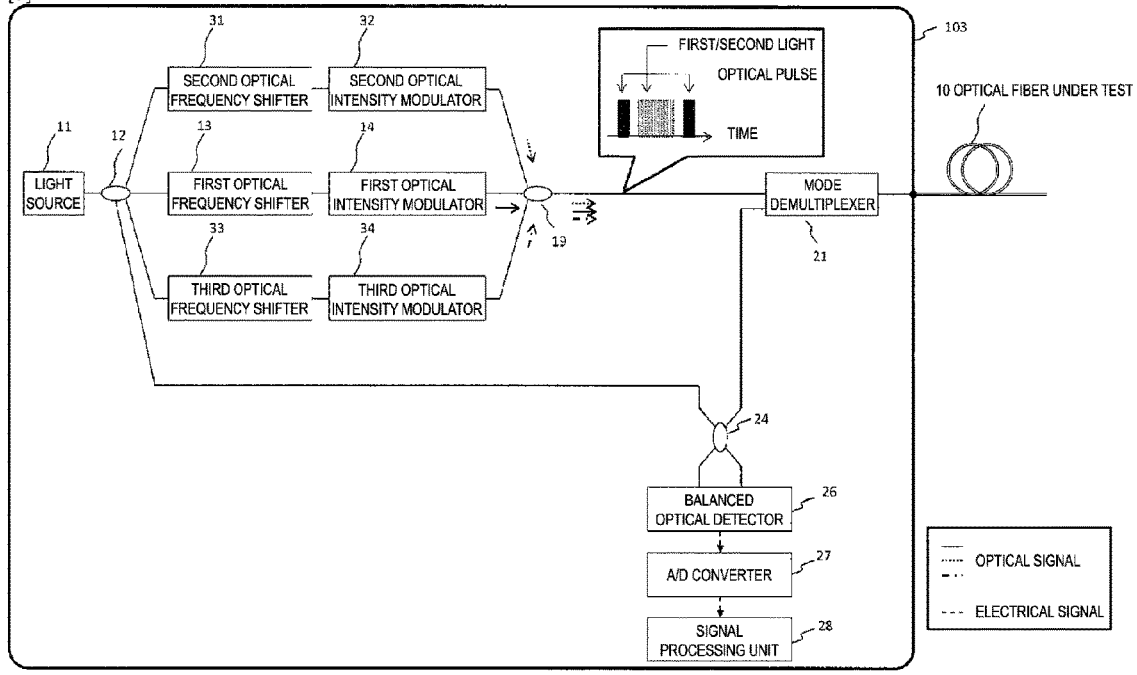
FIG. 5 is a diagram illustrating an optical pulse test apparatus according to the present disclosure.

An example of a configuration of the optical pulse test apparatus of the embodiment according to the present disclosure is illustrated in FIG. 5.

In FIG. 5, the light generation unit includes the light source 11, the optical splitter 12, the first optical frequency shifter 13, the first optical intensity modulator 14, a second optical frequency shifter 31, a second optical intensity modulator 32, a third optical frequency shifter 33, a third optical intensity modulator 34, and an optical coupler 19. The light source 11 outputs continuous light having an optical frequency $v_0$. The output continuous light is split by the optical splitter 12. One part of the split continuous light has an optical frequency converted into $v_0+\Delta v_1$ by the first optical frequency shifter 13, and then is pulsed by the first optical intensity modulator 14.

Using another part of the split continuous light as a carrier wave, the continuous light having the optical frequency $v_0$ is converted into light having the optical frequency $v_0+\Delta v_2$ by the second optical frequency shifter 31, and then, the resultant light is pulsed by the second optical intensity modulator 32.

Using still another part of the split continuous light as a carrier wave, the continuous light having the optical frequency $v_0$ is converted into light having the optical frequency $v_0-\Delta v_3$ by the third optical frequency shifter 33, and then, the resultant light is pulsed by the third optical intensity modulator 34.

The optical pulse having an optical frequency $v_0+\Delta v_1$, the first light having an optical frequency $v_0+\Delta v_2$, the second light having an optical frequency $v_0-\Delta v_3$ are multiplexed by the optical coupler 19.

The first light having the optical frequency $v_0+\Delta v_2$ output from the second optical frequency shifter 31 and the second light having the optical frequency $v_0-\Delta v_3$ output from the third optical frequency shifter 33 may be multiplexed, while both remaining unchanged as the continuous light beams, with the optical pulse having the optical frequency $v_0+\Delta v_1$ by the optical coupler 19. Further, both or one of the first light having the optical frequency $v_0+\Delta v_2$ output from the second optical frequency shifter 31 and the second light having the optical frequency $v_0-\Delta v_3$ output from the third optical frequency shifter 33 may be pulsed by the second optical intensity modulator 32 or the third optical intensity modulator 34, and multiplexed with the optical pulse having the optical frequency $v_0+\Delta v_1$ by the optical coupler 19. Further, in FIG. 5, both the first light having the optical frequency $v_0+\Delta v_2$ output from the second optical frequency shifter 31 and the second light having the optical frequency $v_0-\Delta v_3$ output from the third optical frequency shifter 33 may be pulsed by the second optical intensity modulator 32 and the third optical intensity modulator 34, and multiplexed with the optical pulse having the optical frequency $v_0+\Delta v_1$ by the optical coupler 19.

When the first light and/or the second light is pulsed, it is desirable that a pulsed leading edge of such light follows a trailing edge of the optical pulse. This is to prevent the influence of the Brillouin amplification and the Brillouin attenuation while the optical pulse is traveling in an optical fiber under test described later.

When the first optical intensity modulator 14 repeatedly generates an optical pulse and the first light and/or the second light is pulsed, it is desirable that a pulsed trailing edge of such light precedes the subsequent leading edge of the optical pulse. This is to prevent the influence of the Brillouin amplification and the Brillouin attenuation while the optical pulse is traveling in an optical fiber under test described later. In an output from the optical coupler 19 illustrated in FIG. 5, a temporal relationship in the output between the optical pulse and the pulsed first light and second light is also illustrated together.

An optical frequency difference between the optical pulse, and the first light and the second light is set to amplify the backscattered light in the LP11 mode through stimulated Brillouin scattering and further attenuate the backscattered light in the LP01 mode. Here, in the optical pulse test apparatus of the present embodiment, the optical frequency of the optical pulse generated by the light generation unit is $v_0+\Delta v_1$, the optical frequency of the first light is $v_0+\Delta v_2$, and the optical frequency of the second light is $v_0-\Delta v_3$. At this time, the difference $\Delta v_2-\Delta v_1$ between the optical frequency of the first light and the optical frequency of the optical pulse is an optical frequency difference where the power more greatly shifts from the first light to the backscattered light in the LP11 mode than the light in the LP01 mode, out of the backscattered light beams in the two LP modes, through the stimulated Brillouin scattering. At this time, $\Delta v_3+\Delta v_1$ which is the difference between the optical frequency of the optical pulse and the optical frequency of the second light is an optical frequency difference in which a power more greatly shifts to the second light from the backscattered light in the LP01 mode than in the LP11 mode, out of the backscattered light beams in the two LP modes, through the stimulated Brillouin scattering.

In FIG. 5, the mode demultiplexing unit includes the mode demultiplexer 21. The optical pulse, the first light, and the second light generated by the light generation unit enter the mode demultiplexer 21. The mode demultiplexer 21 is a mode demultiplexer provided with a directional coupler including a planar lightwave circuit as described in NPL 2. The optical pulse, the first light, and the second light enter one end of the optical fiber under test 10, in the LP01 mode, from the mode demultiplexer 21. Out of the backscattered light and reflected light beams from the optical fiber under test 10, a component in the LP11 mode is demultiplexed by the mode demultiplexer 21.

In FIG. 5, the local oscillation light generation unit utilizes, as local oscillating light, the continuous light from the light source 11 that is split by the optical splitter 12.

In FIG. 5, the light reception unit includes the optical coupler 24 and the balanced optical detector 26. Out of the backscattered light beams and the reflected light beams having the optical frequency $v_0+\Delta v_1$ separated for each mode by the mode demultiplexer 21, the component in the LP11 mode is guided to the optical coupler 24 and multiplexed with the local oscillation light having the optical frequency $v_0$. Thereafter, the resultant light is photoelectrically converted by the balanced optical detector 26.

In FIG. 5, the arithmetic processing unit includes the analog/digital (A/D) converter 27 and the signal processing unit 28. An electrical signal from the balanced optical detector 26 is converted to digital data by the A/D converter 27. The digital data is input to the signal processing unit 28. The signal processing unit 28 extracts an amplitude of the frequency component $\Delta v_1$ from the digital data through fast Fourier transform, and acquires a time response to the obtained waveform as a time-intensity distribution (OTDR waveform) for the backscattered light in the LP11 mode.

A feature that the optical pulse test apparatus having the configuration illustrated in FIG. 5 amplifies the backscattered light in the LP11 mode and further attenuates the backscattered light in the LP01 mode will be described below.

Figure 7:
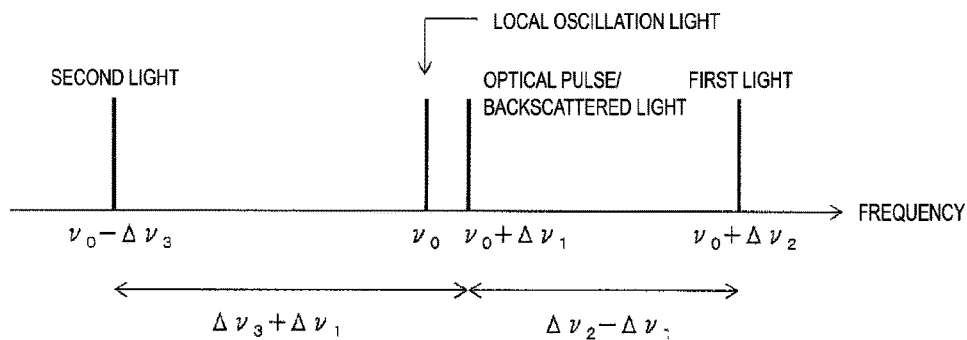
FIG. 7 is a chart showing a relationship of optical frequencies according to the optical pulse test apparatus of the present disclosure.

A case will be considered where the optical pulse having the optical frequency $v_0+\Delta v_1$, the first light having the optical frequency $v_0+\Delta v_2$, and the second light having the optical frequency $v_0-\Delta v_3$ enter the optical fiber under test 10. A relationship among these optical frequencies is shown in FIG. 7.

When the entered optical pulse propagates through the optical fiber under test 10, the backscattered light beams in the LP01 mode and the LP11 mode are generated. The optical frequencies of the backscattered light beams, which are equal to that of the optical pulse, are $v_0+\Delta v_1$. The backscattered light in each of the modes returns to an incident end side of the optical pulse. The backscattered light propagates while countering with the entered first light and second light. When the light beams propagating while countering with each other pass by, if an optical frequency difference between the light beams is within a Brillouin frequency shift band, power shifts from the light beam having a higher frequency to the light beam having a lower frequency. Here, the Brillouin frequency shift band depends on a combination of modes of the light beams propagating while countering with each other, and thus, the Brillouin frequency shift bands are different between the backscattered light beams in the LP01 mode and the LP11 mode.

Figure 8:
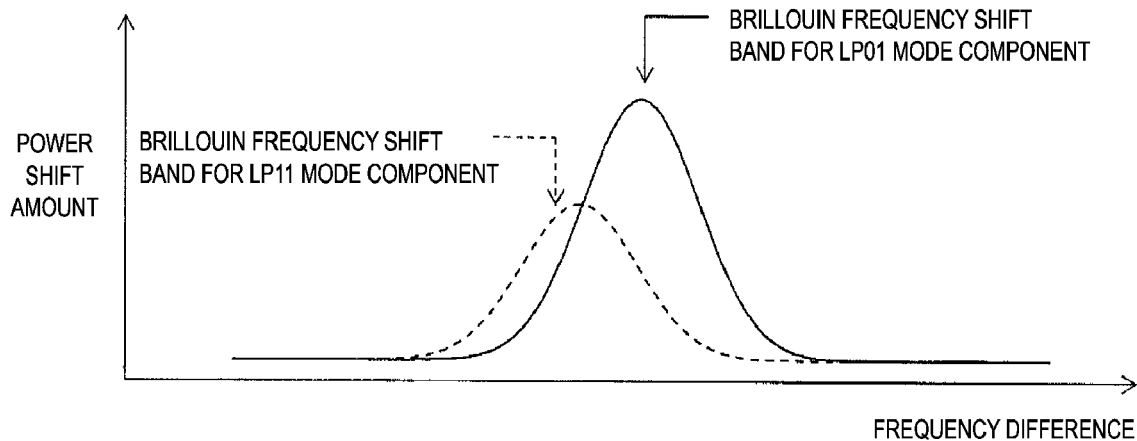
FIG. 8 is a graph showing a relationship of Brillouin frequency shift bands (reshown, see FIG. 4).

FIG. 8 shows a relationship of the Brillouin frequency shift band for the backscattered light beams in the LP01 mode and the LP11 mode. A horizontal axis represents a frequency difference, and a vertical axis represents a magnitude of power shifted through Brillouin scattering.

Here, the optical frequency difference $\Delta v_3+\Delta v_1$ between the backscattered light in the LP01 mode having the optical frequency $v_0+\Delta v_1$ and the second light having the optical frequency $v_0-\Delta v_3$ is set to an optical frequency difference where the power shift from the backscattered light in the LP01 mode to the second light is as large as possible, and the power shift from the backscattered light in the LP11 mode to the second light is as small as possible. With such an optical frequency difference, it is possible to attenuate the backscattered light in the LP01 mode while suppressing the attenuation of the backscattered light in the LP11 mode.

Further, the optical frequency difference $\Delta v_2-\Delta v_1$ between the backscattered light in the LP11 mode having the optical frequency $v_0+\Delta v_1$ and the first light having the optical frequency $v_0+\Delta v_2$ is set to an optical frequency difference where the power shift from the first light to the backscattered light in the LP11 mode is as large as possible, and further, the power shift from the first light to the backscattered light in the LP01 mode is as small as possible. With such an optical frequency difference, it is possible to amplify the backscattered light in the LP11 mode while suppressing the amplification of the backscattered light in the LP01 mode.

Figure 9:
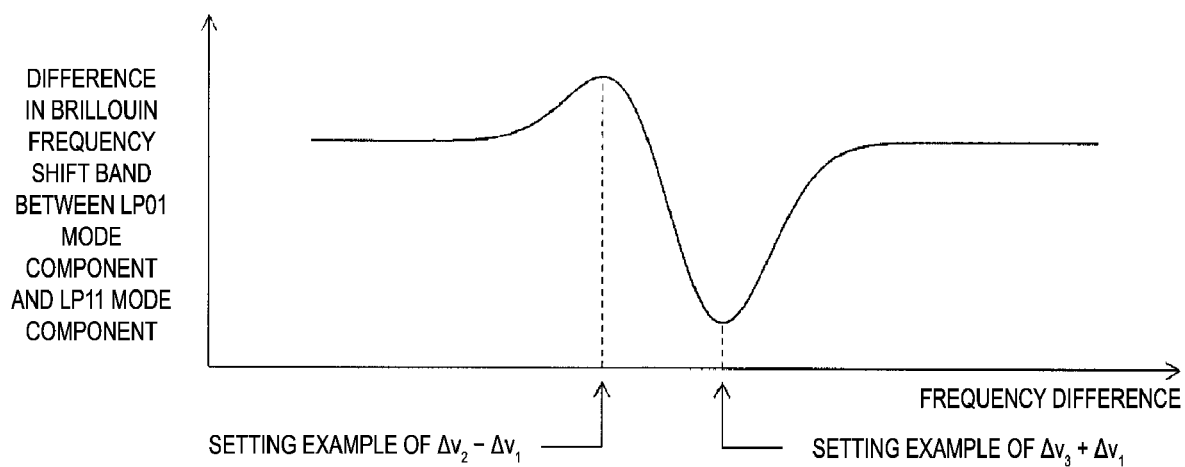
FIG. 9 is a graph showing an example of setting a frequency difference according to the optical pulse test apparatus of the present disclosure.

To illustrate an example of specific settings of the optical frequency difference $\Delta v_3+\Delta v_1$ and the optical frequency difference $\Delta v_2-\Delta v_1$, a result obtained by subtracting a value of the Brillouin frequency shift band for the LP01 mode component from a value of the Brillouin frequency shift band for the LP11 mode component in FIG. 8 is provided in FIG. 9. Here, it is desirable that the optical frequency difference $\Delta v_3+\Delta v_1$ is an optical frequency difference by which the value of the Brillouin frequency shift band shown in FIG. 9 is minimized, and the optical frequency difference $\Delta v_2-\Delta v_1$ is an optical frequency difference by which the value of the Brillouin frequency shift band shown in FIG. 9 is maximized.

With the optical pulse test apparatus and the optical pulse test method according to the present disclosure, it is possible to independently select $\Delta v_2$ and $\Delta v_3$, and thus, even in an optical fiber network in which a modal crosstalk exists, it is possible to detect a bend and a lateral pressure with higher sensitivity.

Fourth Embodiment

Figure 6:
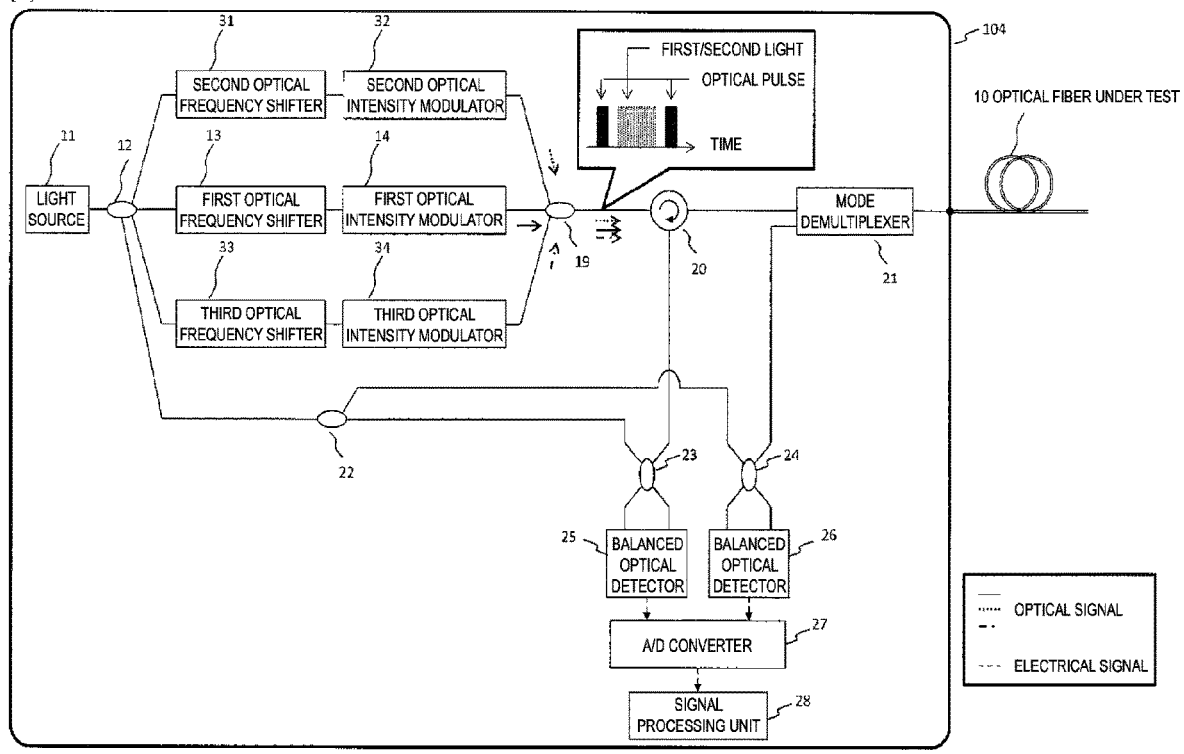
FIG. 6 is a diagram illustrating an optical pulse test apparatus according to the present disclosure.

An example of a configuration of an optical pulse test apparatus 104 of an embodiment according to the present disclosure is illustrated in FIG. 6. The optical pulse test apparatus in the embodiment according to the present disclosure, as illustrated in FIG. 6, includes the following features in addition to those of the optical pulse test apparatus according to the third embodiment. The characteristics are such that the mode demultiplexing unit further separates the backscattered light in the LP01 mode, out of the backscattered light beams generated by the optical pulse, the light reception unit further multiplexes the backscattered light in the LP01 mode separated by the mode demultiplexing unit and the local oscillation light generated by the local oscillation light generation unit and photoelectrically converts the multiplexed light into an electrical signal, and the arithmetic processing unit further calculates the time-intensity distribution (OTDR waveform) of the electrical signal obtained by the light reception unit photoelectrically converting the backscattered light in the LP01 mode.

An optical frequency difference between the optical pulse, and the first light and the second light is set to amplify the backscattered light in the LP11 mode through stimulated Brillouin scattering and further attenuate the backscattered light in the LP01 mode. Here, in the optical pulse test apparatus of the present embodiment, the optical frequency of the optical pulse generated by the light generation unit is $v_0+\Delta v_1$, the optical frequency of the first light is $v_0+\Delta v_2$, and the optical frequency of the second light is $v_0-\Delta v_3$. At this time, the difference $\Delta v_2-\Delta v_1$ between the optical frequency of the first light and the optical frequency of the optical pulse is an optical frequency difference where the power more greatly shifts from the first light to the backscattered light in the LP11 mode than the light in the LP01 mode, out of the backscattered light beams in the two LP modes, through the stimulated Brillouin scattering. At this time, $\Delta v_3+\Delta v_1$ which is the difference between the optical frequency of the optical pulse and the optical frequency of the second light and is an optical frequency difference in which a power more greatly shifts to the second light from the backscattered light in the LP01 mode than in the LP11 mode, out of the backscattered light beams in the two LP modes, through the stimulated Brillouin scattering.

In FIG. 6, the light generation unit is similar in configuration to that in the third embodiment.

In FIG. 6, the mode demultiplexing unit further includes the optical circulator 20 between the optical coupler 19 and the mode demultiplexer 21. The optical pulse, the first light, and the second light generated by the light generation unit enter the mode demultiplexer 21 via the optical circulator 20. The mode demultiplexer 21 is a mode demultiplexer provided with a directional coupler including a planar lightwave circuit as described in NPL 2. The optical pulse, the first light, and the second light enter one end of the optical fiber under test 10, in the LP01 mode, from the mode demultiplexer 21. Out of the backscattered light and reflected light beams from the optical fiber under test 10, a component in the LP11 mode is demultiplexed by the mode demultiplexer 21. A component in the LP01 mode is separated by the optical circulator 20.

In FIG. 6, the local oscillation light generation unit further includes the optical splitter 22 configured to split the continuous light from the light source 11 split by the optical splitter 12, and utilizes the split light beams as two local oscillation light beams.

In FIG. 6, the light reception unit further includes the optical coupler 23 and the balanced optical detector 25. In addition to third embodiment, out of the backscattered light beams and the reflected light beams separated by the mode demultiplexer 21 for each mode, the component in the LP01 mode is multiplexed with the local oscillation light by the optical coupler 23 by way of the optical circulator 20, and thereafter, photoelectrically converted by the balanced optical detector 25.

In FIG. 6, the arithmetic processing unit includes the analog/digital (A/D) converter 27 and the signal processing unit 28. Electrical signals from the balanced optical detectors 25 and 26 are converted to digital data by the A/D converter 27. The digital data is input to the signal processing unit 28. The signal processing unit 28 extracts an amplitude of the frequency component $v_0+\Delta v_1$ from the digital data through fast Fourier transform, and acquires a time response to the obtained waveform as a time-intensity distribution (OTDR waveform) for the backscattered light in the LP01 mode or the LP11 mode.

With the optical pulse test apparatus and the optical pulse test method of the embodiment according to the present disclosure, it is possible to independently select $\Delta v_2$ and $\Delta v_3$, and thus, even in an optical fiber network in which a modal crosstalk exists, it is possible to detect a bend and a lateral pressure with higher sensitivity. It is further possible to obtain detailed information on a bend and a lateral pressure even in an optical fiber network in which a modal crosstalk exists by observing not only the backscattered light in the LP11 mode but also the backscattered light in the LP01 mode, out of the backscattered light beams in the two LP modes.

OTHER EMBODIMENTS

The present invention is not limited to the embodiments disclosed above, and various modifications can be made without departing from the gist of the present invention.

The present invention is not limited to the above-described embodiments as it is, and can be embodied with the components modified without departing from the spirit of the present invention when implemented. For example, the signal processing unit can also be realized by a computer and a program, and can also record a program in a recording medium and provide a program through a network.

Furthermore, various inventions can be formed by appropriate combinations of a plurality of components disclosed in the above-described embodiment. For example, several components may be deleted from all of the components illustrated in the embodiment. Furthermore, components of different embodiments may be appropriately combined with each other.

INDUSTRIAL APPLICABILITY

The present disclosure can be applied in the information communication industry.

REFERENCE SIGNS LIST

10: Optical fiber under test
11: Light source
12: Optical splitter
13: First optical frequency shifter
14: First optical intensity modulator
15: Optical amplitude modulator
17: Second optical intensity modulator
19: Optical coupler
20: Optical circulator
21: Mode demultiplexer
22: Optical splitter
23, 24: Optical coupler
25, 26: Balanced optical detector
27: A/D converter
28: Signal processing unit
31: Second optical frequency shifter
32: Second optical intensity modulator
33: Third optical frequency shifter
34: Third optical intensity modulator
101, 102, 103, 104: Optical pulse test apparatus

The invention claimed is:

1. An optical pulse test apparatus, comprising:
a light generation unit configured to generate an optical pulse for generating backscattered light beams in an optical fiber under test and generate first light having an optical frequency for amplifying backscattered light in an LP11 mode out of the backscattered light beams in two LP modes through stimulated Brillouin scattering, and second light having an optical frequency for attenuating backscattered light in an LP01 mode out of the backscattered light beams in the two LP modes through stimulated Brillouin scattering;
a mode demultiplexing unit configured to input the optical pulse, the first light, and the second light generated by the light generation unit into the optical fiber under test in the LP01 mode and separate backscattered light in the LP11 mode out of backscattered light beams generated by the optical pulse;

a local oscillation light generation unit configured to generate local oscillation light by which the backscattered light separated by the mode demultiplexing unit is heterodyne-detected;

a light reception unit configured to multiplex the backscattered light in the LP11 mode separated by the mode demultiplexing unit and the local oscillation light generated by the local oscillation light generation unit and photoelectrically convert the multiplexed light into an electrical signal; and an arithmetic processing unit configured to calculate a time-intensity distribution of the electrical signal obtained by the light reception unit photoelectrically converting the backscattered light in the LP11 mode.

2. The optical pulse test apparatus according to claim 1, wherein the mode demultiplexing unit further separates backscattered light in the LP01 mode out of the backscattered light beams generated by the optical pulse, the light reception unit further multiplexes the backscattered light in the LP01 mode separated by the mode demultiplexing unit and the local oscillation light generated by the local oscillation light generation unit, and photoelectrically converts the multiplexed light into an electrical signal, and the arithmetic processing unit further calculates a time-intensity distribution of the electrical signal obtained by the light reception unit photoelectrically converting the backscattered light in the LP01 mode.

3. The optical pulse test apparatus according to claim 1, wherein when an optical frequency of the optical pulse generated by the light generation unit is $v_0+\Delta v_1$, the optical frequency of the first light is $v_0+\Delta v_2$, and the optical frequency of the second light is $v_0-\Delta v_2$, $\Delta v_2-\Delta v_1$ being a difference between the optical frequency of the first light and the optical frequency of the optical pulse is an optical frequency difference in which a power more greatly shifts from the first light to backscattered light in the LP11 mode than in the LP01 mode, out of the backscattered light beams in the two LP modes, through stimulated Brillouin scattering, and $\Delta v_2-\Delta v_1$ being a difference between the optical frequency of the optical pulse and the optical frequency of the second light is an optical frequency difference in which a power more greatly shifts from backscattered light in the LP01 mode than in the LP11 mode, out of the backscattered light beams in the two LP modes, to the second light through stimulated Brillouin scattering.

4. The optical pulse test apparatus according to claim 3, wherein in the light generation unit, a light source having an optical frequency $v_0$ is shifted by a frequency $\Delta v_1$ by a first optical frequency shifter so that the optical pulse is generated by a first optical intensity modulator, and first light having an optical frequency $v_0+\Delta v_2$ and second light having an optical frequency $v_0-\Delta v_2$ are generated from the light source having the optical frequency $v_0$, by a double side-band suppressed carrier amplitude modulator.

5. The optical pulse test apparatus according to claim 1, wherein when an optical frequency of the optical pulse generated by the light generation unit is $v_0+\Delta v_1$, the optical frequency of the first light is $v_0+\Delta v_2$, and the optical frequency of the second light is $v_0-\Delta v_3$, $\Delta v_2-\Delta v_1$ being a difference between the optical frequency of the first light and the optical frequency of the optical pulse is an optical frequency difference in which a power more greatly shifts from the first light to backscattered light in the LP11 mode than in the LP01 mode, out of the backscattered light beams in the two LP modes, through stimulated Brillouin scattering, and $\Delta v_3+\Delta v_1$ being a difference between the optical frequency of the optical pulse and the optical frequency of the second light is an optical frequency difference in which a power more greatly shifts from backscattered light in the LP01 mode than in the LP11 mode, out of the backscattered light beams in the two LP modes, to the second light through stimulated Brillouin scattering.

6. The optical pulse test apparatus according to claim 5, wherein in the light generation unit, a light source having an optical frequency $v_0$ is shifted by an optical frequency $\Delta v_1$ by a first optical frequency shifter so that the optical pulse is generated by a first optical intensity modulator, the light source having the optical frequency $v_0$ is shifted by an optical frequency $\Delta v_2$ by a second optical frequency shifter to generate the first light, and the light source having the optical frequency $v_0$ is shifted by an optical frequency $\Delta v_3$ by a third optical frequency shifter to generate the second light.

7. The optical pulse test apparatus according to claim 1, wherein in the light generation unit, at least one of the first light and the second light is pulsed by a second optical intensity modulator or a third optical intensity modulator.

8. The optical pulse test apparatus according to claim 7, wherein a pulsed leading edge of the pulsed first light or second light follows a trailing edge of the optical pulse.

9. The optical pulse test apparatus machine according to claim 7, wherein the optical pulse is repeatedly generated, and a pulsed trailing edge of the pulsed first light or second light precedes a leading edge of the optical pulse subsequent to the trailing edge.

10. An optical pulse test method, comprising:

generating an optical pulse for generating backscattered light beams in an optical fiber under test and generating first light having an optical frequency for amplifying backscattered light in an LP11 mode out of the backscattered light beams in two LP modes through stimulated Brillouin scattering and second light having an optical frequency for attenuating backscattered light in an LP01 mode out of the backscattered light beams in the two LP modes through stimulated Brillouin scattering;

inputting the generated optical pulse, first light, and second light into the optical fiber under test in the LP01 mode and separating the backscattered light in the LP11 mode out of the backscattered light beams generated by the optical pulse;

generating local oscillation light by which the separated backscattered light is heterodyne-detected;

multiplexing the separated backscattered light in the LP11 mode and the generated local oscillation light and photoelectrically converting the multiplexed light into an electrical signal; and calculating a time-intensity distribution of the electrical signal obtained by photoelectrically converting the backscattered light in the LP11 mode.

* * * * *